United States Patent [19]
Knox

[11] 3,882,273
[45] May 6, 1975

[54] OPTICAL BEAM SCANNING SYSTEM

[75] Inventor: Joseph Dale Knox, Princeton, N.J.

[73] Assignee: RCA Corporation, New York, N.Y.

[22] Filed: Oct. 24, 1973

[21] Appl. No.: 409,177

[52] U.S. Cl. ......... 178/7.6; 178/DIG. 28; 178/7.92; 350/161
[51] Int. Cl. ............................................ H04n 3/10
[58] Field of Search............ 178/7.6, DIG. 28, 7.92; 350/161

[56] References Cited

UNITED STATES PATENTS 3,397,605 8/1968 Brueggemann .......................... 88/1
3,514,534 5/1970 Korpel ................................ 178/7.5

*Primary Examiner*—Robert L. Griffin
*Assistant Examiner*—Edward L. Coles
*Attorney, Agent, or Firm*—Edward J. Norton; Carl V. Olson

[57] ABSTRACT

A system for scanning a laser beam at television rates includes an acousto-optic Bragg-angle deflector for horizontal scanning, and a rotatable galvanometer mirror for vertical scanning. The optical path includes spherical and cylindrical lenses in an arrangement that utilizes inexpensive lenses, provides high resolution, and is physically compact.

10 Claims, 6 Drawing Figures

VERTICAL PLANE

HORIZONTAL PLANE

VERTICAL PLANE

HORIZONTAL PLANE

OPTICAL BEAM SCANNING SYSTEM

BACKGROUND OF THE INVENTION

The invention relates to systems for deflecting a light beam so that it horizontally and vertically scans a utilization plane or raster in a manner analogous to the way a cathode ray scans the face of a television picture tube. A scanning light beam has the advantage of not being confined to an evacuated cathode ray tube envelope. The scanned light beam can be used in a camera mode as a flying spot scanner. In this case, a subject is scanned by the light beam and a photocell creates a video signal from light reflected from the subject. The scanned light beam can also be modulated by a video signal prior to being deflected, for the purpose of creating a television-type display on a screen. Such a system is described in U.S. Pat. No. 3,514,534 issued on May 26, 1970, to A. Korpel.

The described prior art horizontal and vertical scanning system includes an acousto-optic horizontal deflector operating at a rate of about 15,750 Hz. The horizontal deflector has a rectangular aperture with an elongated dimension in the plane of horizontal deflection, and a narrow dimension at right angles thereto. It is therefore necessary to expand the laser light beam solely in the plane of horizontal deflection for passage through the horizontal deflector. And, it is necessary to converge the deflected beam in the horizontal deflection plane to focus at a display screen. Because of the oblong cross sectional shape of the beam going through the horizontal deflector, the optical system includes cylindrical lenses as well as spherical lenses. The prior art scanning systems employ spherical and cylindrical lenses in an arrangement which, to provide a desired definition, require the cylindrical lenses to be of expensive high quality, and require the cylindrical lenses to be of relatively long focal lengths, so that the optical path is necessarily long and cumbersome.

SUMMARY OF THE INVENTION

In an acousto-optic deflection system according to the invention, a laser beam expander expands the laser beam to the elongated dimension of the acousto-optic deflector. A cylindrical lens is positioned where the beam is only slightly-expanded, and the lens is oriented to not affect the beam in the horizontal plane, but to converge the slightly-expanded beam in the vertical plane for passage through the narrow dimension of the horizontal deflector. As a consequence, a given high resolution is obtained using cylindrical lenses of only average quality, and of relatively short focal lengths so that the deflection light path is conveniently compact.

DESCRIPTION OF THE PRIOR ART

Figure 1A:
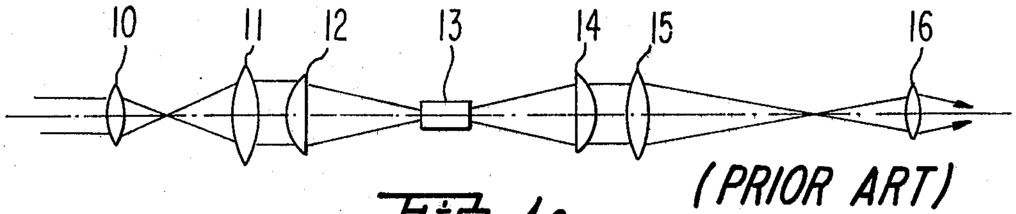
(PRIOR ART) Fig. 1a
FIGS. 1*a* and 1*b* show a prior art optical system for vertical and horizontal deflection of a light beam.
Figure 1B:
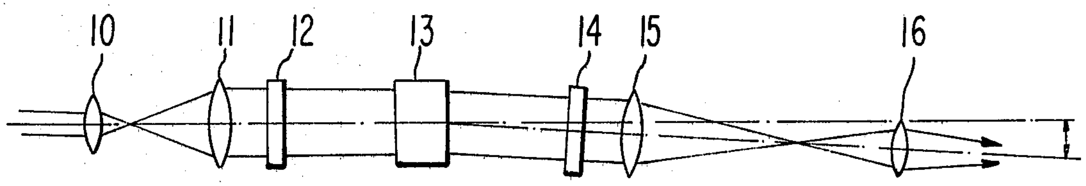

Reference is now made in greater detail to FIGS. 1*a* and 1*b* for a description of a prior art optical deflection system such as is included in U.S. Pat. No. 3,514,534, supra. Spherical lenses 10 and 11 constitute a beam expander for a light beam from a laser (not shown). A cylindrical lens 12 converges the expanded beam in the vertical plane of FIG. 1*a* to the narrow dimension of an acousto-optical horizontal deflector 13. Cylindrical lens 12 does not affect the beam in the horizontal plane of FIG. 1*b*. A second cylindrical lens 14 converges the beam from deflector 13 in the vertical plane of FIG. 1*a* but does not affect the beam in the horizontal plane of FIG. 1*b*. Finally, lenses 15 and 16 constitute a reverse telescope for magnifying the deflection produced by horizontal deflector 13. A vertical deflector (not shown) may be included in the system between lens 16 and a utilization plane or screen (not shown).

The prior art arrangement of FIG. 1 is seen to include two cylindrical lenses 12 and 14 arranged in back-to-back relationship on both sides of the horizontal deflector 13. Practical systems having the illustrated arrangement usually involve an optical path length of over one meter. The path length can be somewhat reduced by employing optical lens elements of high quality, and consequent high cost. By contrast, the arrangement according to the invention to be described is adapted to be constructed using low cost lenses in an optical path having a length of about 35 centimeters, which also includes within this distance a vertical deflector.

DESCRIPTION OF PREFERRED EMBODIMENTS

Figure 2A:
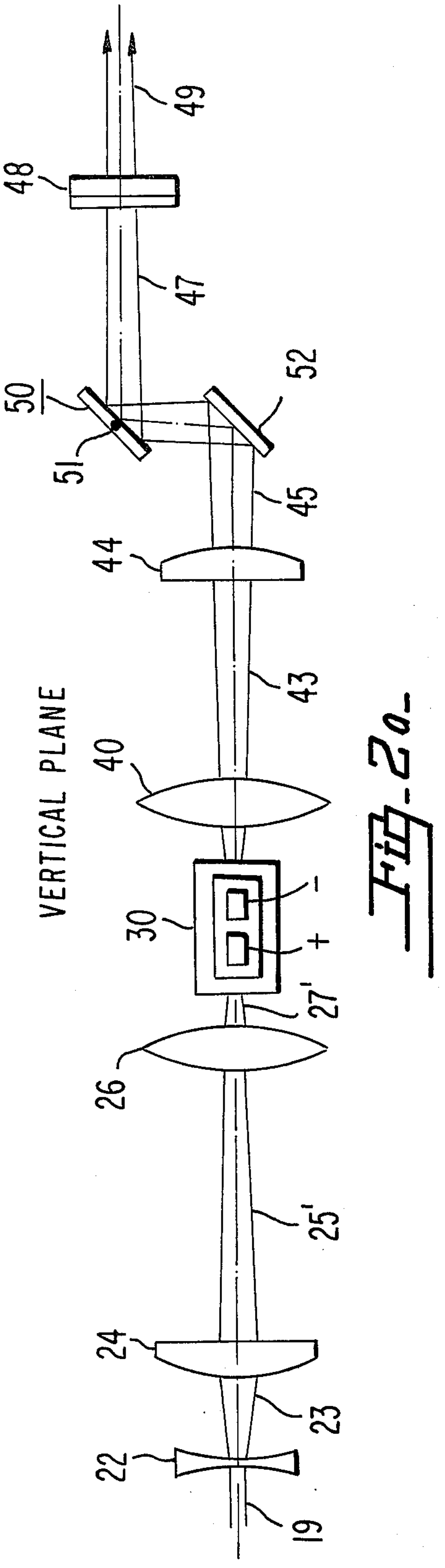
FIGS. 2*a* and 2*b* show a system according to the invention for deflecting a light beam in vertical and horizontal directions.
Figure 2B:
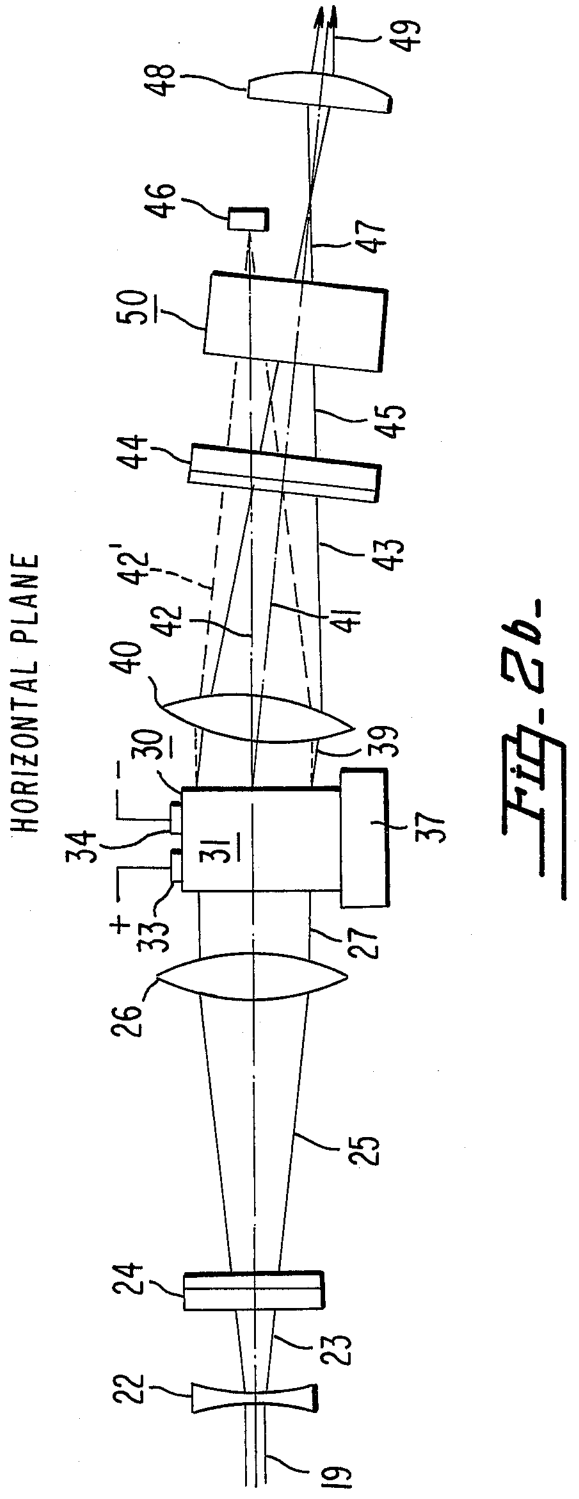

Referring now in greater detail to FIGS. 2a and 2b of the drawing, a laser light beam 19 provided by a conventional laser (not shown) is directed to a spherical, negative, beam-expanding lens 22. The conically-expanding beam 23 encounters a closely-following first cylindrical lens 24 which is oriented to not affect the expanding beam 23,25 in the horizontal plane shown in FIG. 2*b*, but to converge the beam in the vertical plane shown in FIG. 2*a*. The horizontally expanding beam 25 encounters a spherical collimating lens 26 which is designed to converge the horizontally-expanding beam 25 to a beam 27 of rays which are parallel in the horizontal plane shown in FIG. 2*b*. The lens 26, being spherical, is also effective in the vertical plane shown in FIG. 2*a*, where the lens causes an additional converging at 27' of the already converging beam at 25'. The lenses 22, 24 and 26 translate the laser beam 19 into a beam 27 of oval cross section suitable for application to the rectangular aperture of an acousto-optical, Bragg-angle deflector 30.

The deflector 30 includes an acousto-optic medium 21 which may be water, glass, quartz or any other suitable photoelastic material which is transparent to the light to be deflected and is an effective medium for the transmission of sonic stress waves. Lead molybdate is a suitable material, and tellurium dioxide is a preferred material, for the medium 31. One side of the medium 31 is provided with electrodes 33 and 34 of an electromechanical transducer which may be a piezoelectric transducer of any suitable type, such as one made of cadmium sulfide or lithium niobate. The electrodes 33 and 34 are connected by wires to a variable-frequency electric source (not shown), which may provide oscillations in a one-octave range extending, for example, between 100 and 200 MHz. The source provides a signal which sweeps in frequency in sawtooth manner to accomplish a corresponding change of the sonic or acoustic wave propagated through the medium 31, and to cause a television type horizontal deflection of the light beam 27. The side of the acoustooptic medium 31 remote from the transducer 32 is provided with an acoustic termination 37 which is constructed in a known manner to absorb sonic energy arriving thereat.

The beam 39 emerging from the horizontal deflector 30 is deflected in solely the horizontal plane of FIG. 2b. The deflected beam 39, in an actually constructed system, swept through deflection angles of plus and minus 1½° about a deflection centerline 41 displaced about 6 degrees from a zero order, undeflected centerline 42. The beam 39 was about 8 millimeters in width in the horizontal plane of FIG. 2*b*, and about 1 millimeter in thickness in the vertical plane of FIG. 2*a*. Light 42′ passing along the zero-order undiffracted path having the centerline 42 is blocked or stopped by a zero-order stop 46.

The beam 39 exiting from the deflector 30 is directed to a reverse telescope including a spherical converging lens 40, a second cylindrical lens 44 and a third cylindrical projection lens 48. The second cylindrical lens 44 is constructed and positioned to focus the beam from lens 40 in solely the vertical plane of FIG. 2*a* to a point in a utilization plane (not shown). The third cylindrical lens 48 is constructed and positioned to focus the beam in solely the horizontal plane of FIG. 2b to a point in the utilization plane. A vertical deflector including a galvanometer mirror 50 rotatable on a shaft 51 is positioned between lenses 44 and 48. A fixed mirror 52 is included to keep the light beam in a generally linear path. The deflector mirror 50 deflects the beam in the vertical plane of FIG. 2*a*, but does not affect the beam in the horizontal plane of FIG. 2*b*. The vertical scanning rate of television systems is 60 Hz, which is a relatively slow rate easily performed on an optical light beam by means of a galvanometer mirror.

In an actually constructed system according to FIG. 2, the lenses had focal lengths as follows: beam expander lens 22 was —19 mm, first cylindrical lens 24 was 6 cm, spherical lens 26 was 15 cm, spherical lens 40 was 22 cm, second cylindrical lens 44 was 6 cm, and third cylindrical lens 48 was 2 cm. The spacing between lens 22 and 26 was about 13 cm, between lenses 26 and 40 about 8 cm, and between lenses 40 and 48 about 15 cm, making a total of about 36 cm. The laser beam 19 had a diameter of 1½ mm, and the acousto-optic deflector 30 had an aperture dimension of 1 mm in the vertical plane of FIG. 2*a* and an aperture dimension of 8 mm in the horizontal plane of FIG. 2*b*. The vertical deflector mirror 50 received light beam 45 having a cross section of about 5 mm in the vertical plane of FIG. 2*a*.

The described optical system accomplishes the necessary shaping of the laser beam to fit the rectangular deflector 30. This is accomplished by the beam-expanding, negative, spherical lens 22, the cylindrical lens 24 and the spherical lens 26, in an arrangement which is compact and which permits the use of moderate-quality, inexpensive lenses. The reverse telescope including lenses 40, 44 and 48 acts to magnify the relatively slight deflection provided by the acousto-optic deflector 30. The second cylindrical lens 44 is used for focusing the beam in solely the vertical plane, and the third cylindrical lens 48 is used for focusing the beam in solely the horizontal plane. The system is such as to utilize lenses of small apertures (large *f* numbers) and thus the definition of the focused spot on the utilization screen is not limited by the lens distortions but is, for all practical purposes, diffraction limited.

Finally, when the acoustic deflector is operating in a sequential scanning mode in response to a strictly linearly swept rf input, it exhibits a phenomenon known as cylindrical astigmatism. In effect the acoustic deflector behaves like a long-focal-length cylindrical lens. The effective focal length is about 18 meters for lead molybdate and about 1 meter for tellurium dioxide. The equivalent cylindrical lens focal length is $f = v^2T/(\lambda\Delta v)$, where $v$ is the sound velocity in the acoustic medium, T is the linear sweep time duration, $\lambda$ is the light wavelength in air, and $\Delta v$ is the change in acoustic frequency during the sweep. Note that $\Delta v$ can be either positive or negative, depending on the sweep direction. Therefore, if the sweep direction is reversed, the optics must be refocused. With the cylindrical lenses incorporated into the deflection optics (which decouples the horizontal from the vertical focus), a small forward or backward displacement of the third cylindrical lens 48 will correct for the astigmatic effect.

Figure 3A:
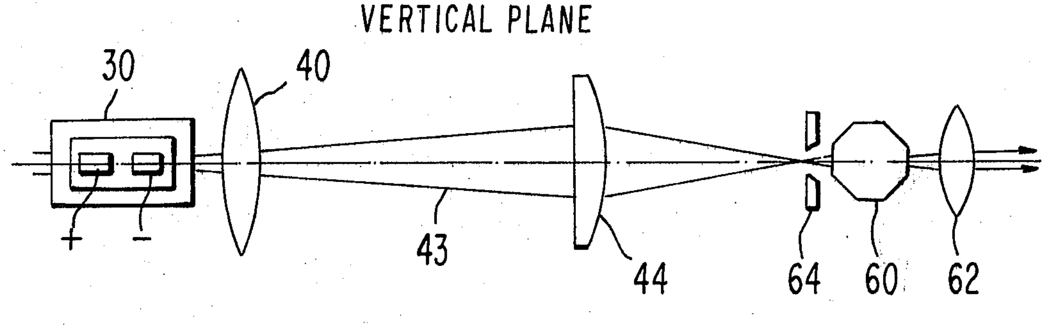
FIGS. 3*a* and 3*b* show a portion of an alternative optical system for vertical and horizontal deflection of a light beam.
Figure 3B:
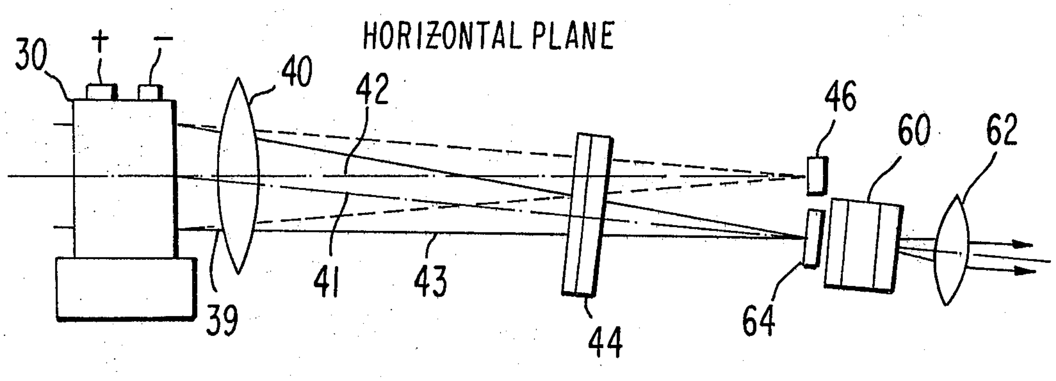

Reference is now made to FIGS. 3*a* and 3*b* showing a modification of the arrangement of FIGS. 2*a* and 2*b* in which the galvanometer mirror vertical deflector 50 is replaced by an 8-sided rotating refractive polygonal prism 60. Also, the third cylindrical projection lens 48 is replaced by a final spherical projection lens 62 of equal focal focal length. And, the cylindrical lens 44 is positioned further along the optical path to focus the beam 43 in the vertical plane of FIG. 3a before it enters the rotating prism 60. This is necessary to optimize the performance of the prism as a vertical deflector. Now, the spherical lens 40 is used to focus the beam on the utilization screen. Also, a slit filter 64 having a slit lying in the horizontal plane is provided to filter out cylindrical aberrations which may be introduced by cylindrical lens 44 when used to focus the beam over a short distance. The slit filter also filters out bulk scattered light encountered in all practical optical lens chains, and thereby gives more contrast and clarity to the image at the utilization screen.

In other respects the system of FIGS. 3*a* and 3*b* is the same as the system of FIGS. 2*a* and 2*b* (the same reference numerals are used for the corresponding elements), and it has the same advantages, as described.

While references are made herein to "horizontal" and "vertical" planes, it will be understood that this has been done for convenience of explanation, and that the planes are at right angles with each other, and may be in any desired relationship with the surface of the earth.

In summary, the two described deflection systems are each capable of operating at real time with a full 10-MHz horizontal TV resolution and a vertical resolution of 200 lines. Both systems derive their fast axis scanning with an acoustic Bragg deflector; they differ only by the means in which they achieve vertical deflection; one employs a scanning mirror galvanometer, the other a rotating prism. Both of these electromechanical deflectors are capable of high resolution and efficiency, and are quite adequate for the slow-axis scanning. The systems have the following advantageous features.

a. proper beam shaping to optimize the apertures of the acoustic deflector and electromechanical deflectors, b. diffraction-limited performance and accommodation of large-aperture (up to 2.5 cm) acoustic deflectors by the optical lens chain, c. adjustability of the aspect ratio of the scanned raster, d. corrosion for the cylindrical astigmatism exhibited by the frequency-swept acoustic deflector, e. compactness (about 35 cm in length or less), f. simplicity and east of alignment, and g. use of simple lenses of average quality.

What is claimed is:

1. In a system for deflecting a light beam in horizontal and vertical directions, an acousto-optic horizontal light deflector having an aperture which is elongated in the horizontal plane of deflection and is narrow in the vertical plane, a spherical beam expander lens to expand the beam to a diameter equal to the elongated dimension of said deflector aperture, a first cylindrical lens positioned closely following said beam expander lens and oriented to not affect light in the horizontal plane but to converge slightly-expanded light in the vertical plane to the narrow dimension of the deflector aperture, a spherical collimator lens to direct the horizontally expanded beam in parallel rays through said acousto-optic deflector, and a reverse telescope, including a spherical converging lens and a second cylindrical lens spaced from said converging lens, to focus the light from said deflector to a point in a utilization plane.

2. The combination as defined in claim 1 wherein a vertical deflector is positioned after said second cylindrical lens.

3. The combination as defined in claim 2 wherein said vertical deflector is a gavanometer mirror deflector.

4. The combination as defined in claim 2 wherein said vertical deflector is a rotating refractive polygonal prism.

5. The combination as defined in claim 1 wherein said reverse telescope includes a third cylindrical lens effective to focus the beam in the horizontal plane to a point on a utilization plane.

6. The combination as defined in claim 5 wherein said second cylindrical lens is effective to focus the beam in the vertical plane to a point on the utilization plane.

7. The combination as defined in claim 6 wherein a vertical deflector is positioned between said second and third cylindrical lenses.

8. The combination as defined in claim 1 wherein said reverse telescope includes a final spherical projection lens, and wherein a vertical deflector is positioned between said second cylindrical lens and said final spherical projection lens.

9. The combination as defined in claim 8 wherein said vertical deflector is a rotating refractive polygonal prism.

10. The combination as defined in claim 1 in which a slit filter is positioned just prior to said rotating prism and oriented with a slit lying in the horizontal plane.

* * * * *